United States Patent
Tseng et al.

(10) Patent No.: US 6,873,452 B2
(45) Date of Patent: Mar. 29, 2005

(54) COMPOSITIONS AND PROCESSES FOR FORMAT FLEXIBLE, ROLL-TO-ROLL MANUFACTURING OF ELECTROPHORETIC DISPLAYS

(75) Inventors: Scott C-J Tseng, San Jose, CA (US); Zarng-Arh George Wu, San Jose, CA (US); Xiaojia Wang, Fremont, CA (US); Rong-Chang Liang, Cupertino, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 23 days.

(21) Appl. No.: 10/422,608

(22) Filed: Apr. 23, 2003

(65) Prior Publication Data

US 2004/0045830 A1 Mar. 11, 2004

Related U.S. Application Data

(60) Provisional application No. 60/375,955, filed on Apr. 24, 2002.

(51) Int. Cl.$^7$ .......................... G02B 26/00; G09G 3/34; G03G 13/00; C25D 15/00; C25B 9/00
(52) U.S. Cl. ..................... 359/296; 345/107; 430/40; 204/491; 204/606
(58) Field of Search .................. 359/296; 345/107; 430/40, 32, 126; 204/450, 491, 606; 252/62.56

(56) References Cited

U.S. PATENT DOCUMENTS

| | | | | |
|---|---|---|---|---|
| 3,438,772 A | * | 4/1969 | Gundlach ................... | 430/40 |
| 3,612,758 A | | 10/1971 | Evans et al. ............... | 348/803 |
| 5,930,026 A | | 7/1999 | Jacobson et al. .......... | 359/296 |
| 5,961,804 A | | 10/1999 | Jacobson et al. .......... | 204/606 |

FOREIGN PATENT DOCUMENTS

| JP | 6 281943 | 7/1994 | ......... G02F/1/1343 |
|---|---|---|---|
| WO | WO 01/67170 A1 | 9/2001 | ........... G02F/1/167 |
| WO | WO 02/01281 | 1/2002 | ............. G02F/1/00 |
| WO | WO 02/65215 | 8/2002 | ............. G03F/7/20 |

OTHER PUBLICATIONS

U.S. Provisional Appl. No. 60/367,325, filed Mar. 2002, Ho et al.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621–628.

Nikkei Microdevices. (Dec. 2002) Newly–Developed Color Electronic Paper Promises—Unbeatable Production Efficiency. *Nikkei Microdevices*, 3. (in Japanese, with English translation).

Liang, R.C et al., "Microcup Electrophoretic Displays by Roll–to–Roll Manufacturing Processes" *Proc. of the IDW'02*, International Conference Center Hiroshima (2002).

(List continued on next page.)

*Primary Examiner*—Loha Ben
(74) *Attorney, Agent, or Firm*—Howrey Simon Arnold & White LLP

(57) ABSTRACT

The present invention is directed to a process which comprises removing and stripping off part of the display panel in order to expose and connect the conductor lines on an electrode plate to a driver circuitry. More specifically the process involves (1) preparing a display panel having filled display cells sandwiched between a first and a second substrate layers, preferably by a roll-to-roll process; (2) removing part of a first substrate by asymmetrical cutting by, for example, a die, diamond, knife or laser cutting method to expose the layers underneath (which may include adhesive layer, primer layer, display cell layer and in the case of a display prepared by the microcup technology, the microcup layer and the sealing layer); and (3) stripping off the exposed layers by a stripping solvent or solution. After stripping, the conductor lines on the second substrate are exposed and ready for connection to the driver circuitry.

45 Claims, 6 Drawing Sheets

EDGE SEALING

OTHER PUBLICATIONS

Liang, R.C., "Microcup® Electrophoretic and Liquid Crystal Displays by Roll–to–Roll Manufacturing Process" *USDC Flexible Microelectronics & Displays Conference* Phoenix, AZ (2003).

Liang, R.C. et al., "Passive Matrix Microcup® Electrophoretic Displays" *Proc. of the IDMC'03*, Taipei International Convention Center Taiwan (2003).

Liang, R.C. et al., "Microcup® LCD ANew Type of Dispersed LCD by A Roll–to–Roll Manufacturing Process" *Proc. of the IDCM'03*, Taipei International Convention Center Taiwan (2003).

Hopper, M., et al. "An Electrophoretic Display, Its Properties, Model and Addressing" *IEEE Trans. Electr. Dev.* 26(8):1148–1152 (1979).

U.S. Appl. No. 09/518,488 filed Mar. 3, 2000 (reference available on request).

U.S. Appl. No. 09/606,654 filed Jun. 28, 2000 (reference available on request).

U.S. Appl. No. 09/784,972 filed Feb. 15, 2001 (reference available on request).

U.S. Appl. No. 60/367,3252 filed Mar. 21, 2002 now U.S. Appl. No. 10/394,488 filed Mar. 20, 2003 (reference available on request).

* cited by examiner

BEFORE ASYMMETRIC CUTTING

ASYMMETRIC CUTTING FROM TOP

ASYMMETRIC CUTTING FROM BOTTOM

EDGE SEALING

AFTER STRIPPING

COMPOSITIONS AND PROCESSES FOR FORMAT FLEXIBLE, ROLL-TO-ROLL MANUFACTURING OF ELECTROPHORETIC DISPLAYS

CROSS-REFERENCE TO RELATED APPLICATION

This application claims the benefit of U.S. Provisional Application Ser. No. 60/375,955, filed Apr. 24, 2002, the content of which is incorporated herein by reference in its entirety.

BACKGROUND OF THE INVENTION

1. Field of the Invention

The invention is directed to compositions and processes useful for the roll-to-roll manufacturing of electrophoretic and electromagnetophoretic displays.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

There are several different types of EPDs. In the partition type EPD (see M. A. Hopper and V. Novotny, IEEE Trans. Electr. Dev., 26(8):1148–1152 (1979)), there are partitions between the two electrodes for dividing the space into smaller cells in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Ser. No. 09/518,488, filed on Mar. 3, 2000 (corresponding to WO 01/67170), U.S. Ser. No. 09/606,654, filed on Jun. 28, 2000 (corresponding to WO 02/01281) and U.S. Ser. No. 09/784,972, filed on Feb. 15, 2001 (corresponding to WO02/65215), all of which are incorporated herein by reference. The improved EPD comprises closed cells formed from microcups of well-defined shape, size and aspect ratio, filled with charged pigment particles dispersed in a dielectric solvent and sealed with a polymeric sealing layer.

An electromagnetophoretic display (EMPD) technology was recently disclosed in No. 60/367,325 filed on Mar. 21, 2002, the content of which is incorporated herein by reference. It is understood that while not specifically mentioned, the scope of the present invention encompasses both EPDs and EMPDs.

Traditionally, the EPDs are manufactured by laminating both sides of a compartment filled with an electrophoretic fluid with, patterned electrode layers (such as ITO films). The dispersion-filled compartment may be one of those discussed above, such as that of the partition type or one that involves microcapsules or microchannels. The two electrode layers, however, must be offset in order to expose the conductor lines or patterns for connection to the driver circuitry. The process involving such asymmetric lamination typically is a batch-wise process. In other words, the display panels are laminated piece by piece; thus the process has a very low throughput.

In the manufacturing of a display involving microcups, generally a layer of embossable thermoplastic or thermoset resin composition is first coated on a substrate layer, followed by embossing of the thermoplastic or thermoset resin composition to form the microcups. The microcups are then filled with an electrophoretic or electromagnetophoretic fluid and sealed with a sealing layer.

A second substrate layer is then laminated over the filled and sealed microcups. The display has at least one electrode layer and the electrode layer is usually a conductive layer coated on the side of the substrate layer facing the filled microcups. In addition, at least one of the two substrate layers is transparent to the viewer.

For an EPD, there are two electrode coated substrate layers and the display cells are sandwiched between the two layers. For an EMPD, there are one substrate layer and one electrode coated substrate layer and the cells are sandwiched between the two layers.

The manufacturing of the display described above may be carried out roll-to-roll and as a result, the display cells sandwiched between the two flexible substrate layers may be produced continuously on a web. To complete the construction of a display device, the electrode lines of the display cells must be exposed and connected to a driver circuitry.

To expose the electrode lines for circuitry connection, a strip coating or patch coating process may be employed to deposit the embossable resin composition onto selected areas of the substrate. However, either process has at least four major disadvantages: (1) a sophisticated coating on the first substrate with precision tracking and metering of the embossing composition is needed to define the edge and also to avoid undesirable resin coverage onto the areas having exposed electrode lines or patterns; (2) uneven edge thickness and profile are produced because the embossable composition tends to be squeezed out side-ways during embossing under pressure; (3) the shape and dimension of the display are predefined by the strip or patch coating process; and (4) the filled and sealed microcups must be cut or sliced to the predetermined dimension and laminated piece by piece with registration to the second substrate.

The precision tracking of the coating fluid is difficult particularly if the space between the embossed and non-embossed areas is narrowed to increase the yield or to reduce the amount of scrap material. The uneven edge thickness and profile tend to cause defects and non-uniformity during the subsequent filling and sealing steps. The lack of format flexibility and incompatibility with the roll-to-roll lamination process are even more undesirable from the view points of labor cost, production yield and throughput.

Accordingly, there is a strong need for a more cost effective process with higher yield and throughput to expose the electrode lines or patterns for connection to the driver circuitry.

SUMMARY OF THE INVENTION

The first aspect of the present invention is directed to a process which comprises removing and stripping off part of the display panel in order to expose and connect the conductor lines on an electrode plate to a driver circuitry.

More specifically the process involves (1) preparing a display panel having filled display cells sandwiched between a first and a second substrate layers, preferably by a roll-to-roll process; (2) removing part of a first substrate by asymmetrical cutting by, for example, a die, diamond, knife or laser cutting method to expose the layers underneath (which may include adhesive layer, primer layer, display cell layer and in the case of a display prepared by the microcup technology, the microcup layer and the sealing layer); and (3) stripping off the exposed layers by a stripping solvent or solution. After stripping, the conductor lines on the second substrate are exposed and ready for connection to the driver circuitry.

This process may be repeated to expose the electrode lines or patterns on the first substrate.

Optionally, an edge coating or adhesive may be used before the stripping step to avoid undesirable undercut or penetration by the stripping solvent or solution into the active display areas.

The second aspect of the present invention is directed to the use of a strippable composition for the sealing layer and adhesive layer of cells prepared by the microcup technology to facilitate the stripping process.

The third aspect of the present invention is directed to the use of the strippable composition and stripping process in a format flexible, roll-to-roll display manufacturing process without the need of the precision strip or patch coating/embossing processes.

The fourth aspect of the present invention is directed to the use of the stripping process and strippable composition in combination with the strip or patch coating/embossing processes to improve the yield and throughput.

In all cases, the use of the strippable composition and stripping process of the present invention significantly improves the yield and throughput and dramatically reduces the manufacturing cost for various displays.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by a microembossing or photolithographic process.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size and aspect ratio which are predetermined according to the specific parameters of the manufacturing process.

The term "aspect ratio" is a commonly known term in the art of electrophoretic displays. In this application, it refers to the depth to width or depth to length ratio of the microcups.

Figure 1A:
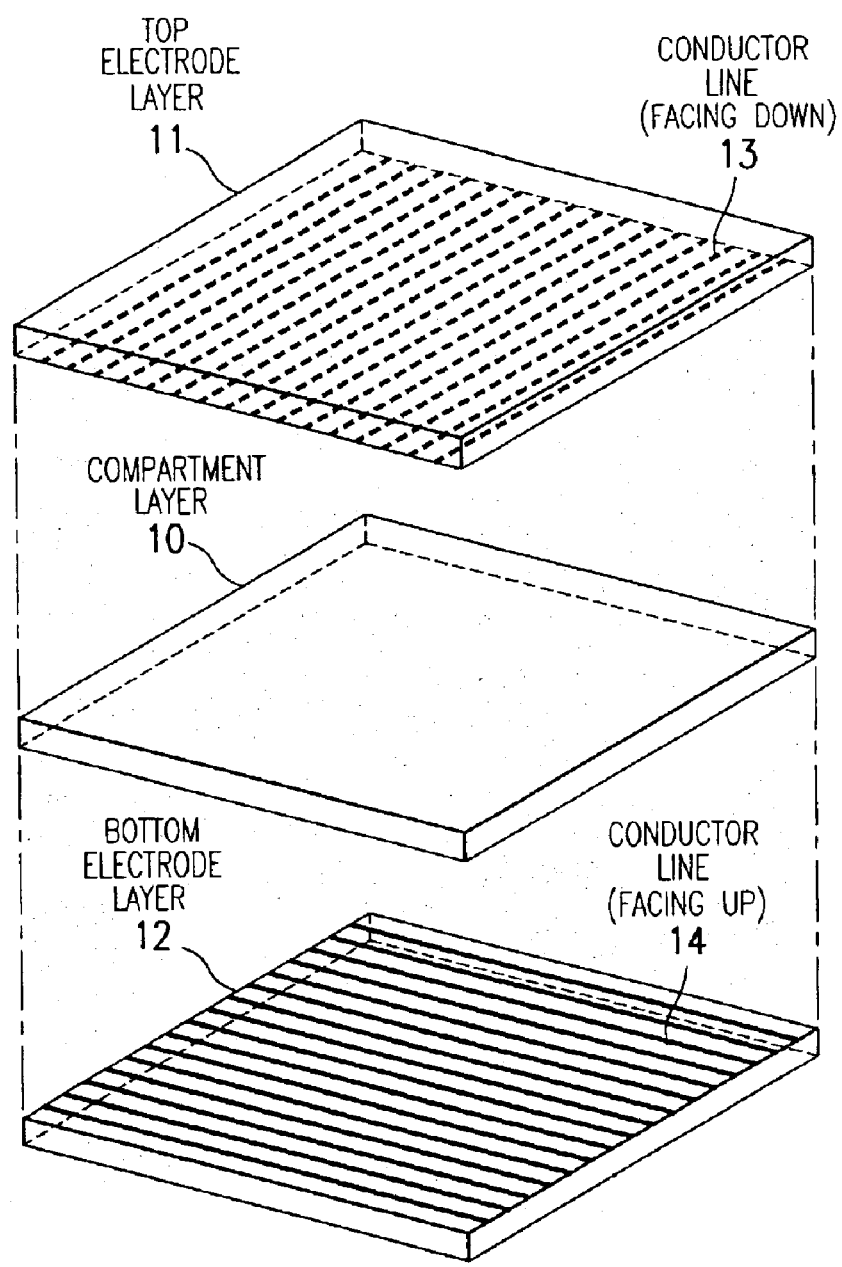
FIGS. 1a–1e illustrate the stripping process of the present invention.

FIG. 1a depicts a convention EPD panel. A compartment or an array of display cells (10) filled with an electrophoretic fluid is sandwiched between a first electrode layer (11) and a second electrode layer (12). There may be an adhesive layer (not shown) between the compartment (10) and the electrode layers. Each of the electrode layers (11 and 12) is formed of a substrate layer coated with a conductive layer such as a metal or metal oxide thin film. The conductor layers on both substrate layers face the compartment layer (10), and the conductor lines (13) on the first electrode layer (11) are perpendicular to the conductor lines (14) on the second electrode layer (12).

Suitable substrate layers include, but not limited to, PET [poly(ethylene terephthalate)], PEN (polyethylene naphthalate), PC (polycarbonate), polysulphone, polyimide, polyarylether, epoxy, phenolic and composites thereof.

Figure 1B:
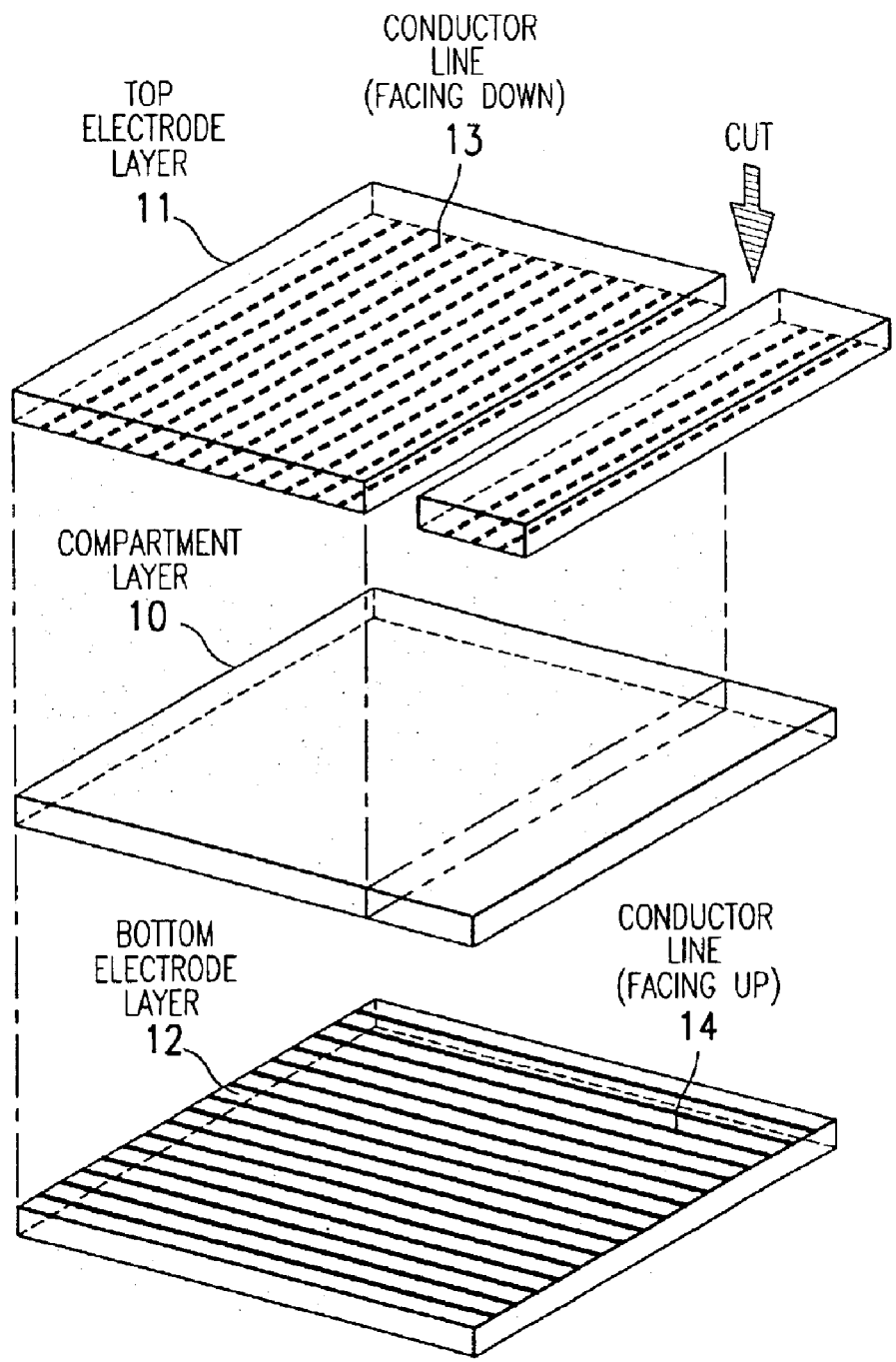
Figure 1C:
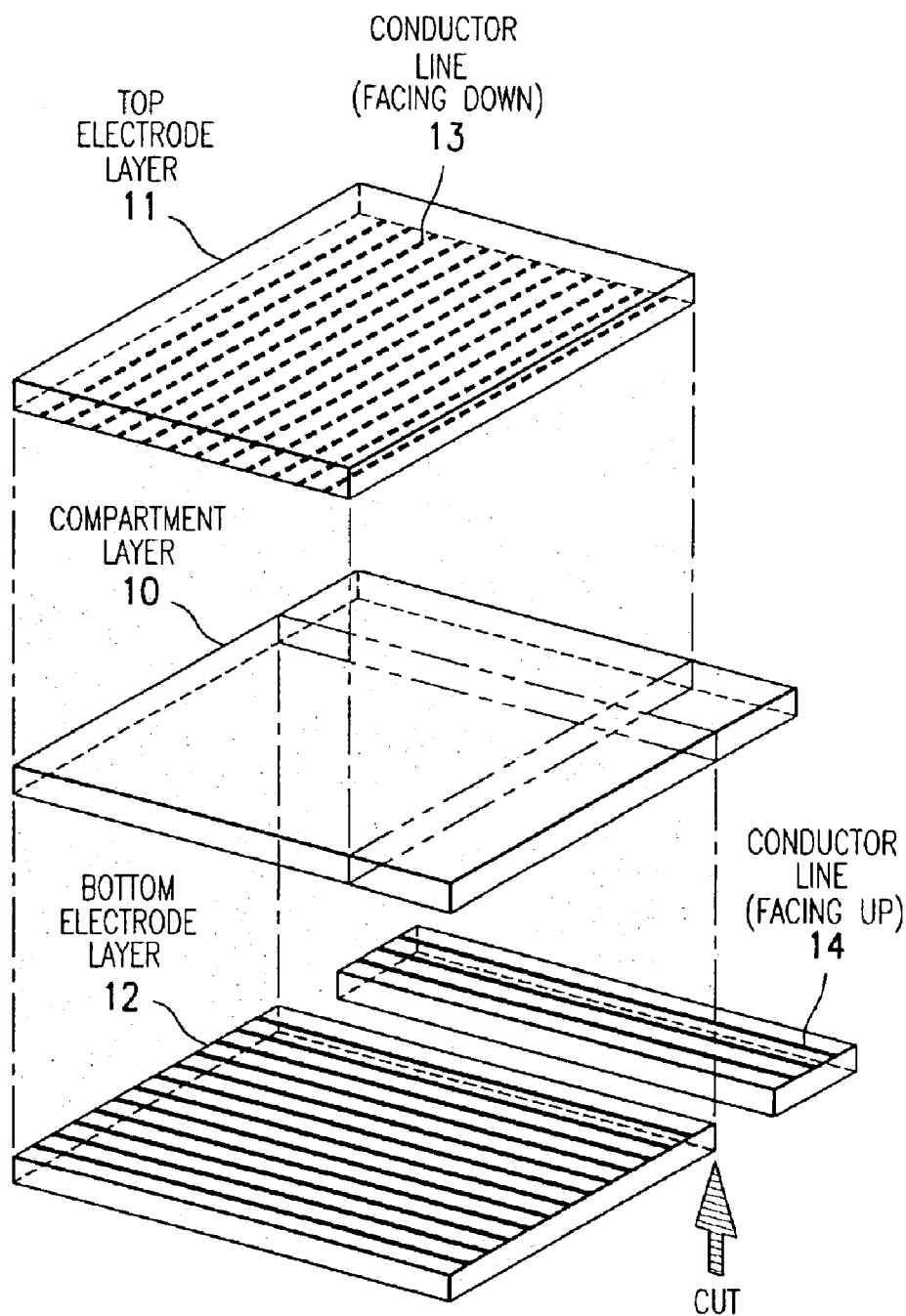
Figure 1D:
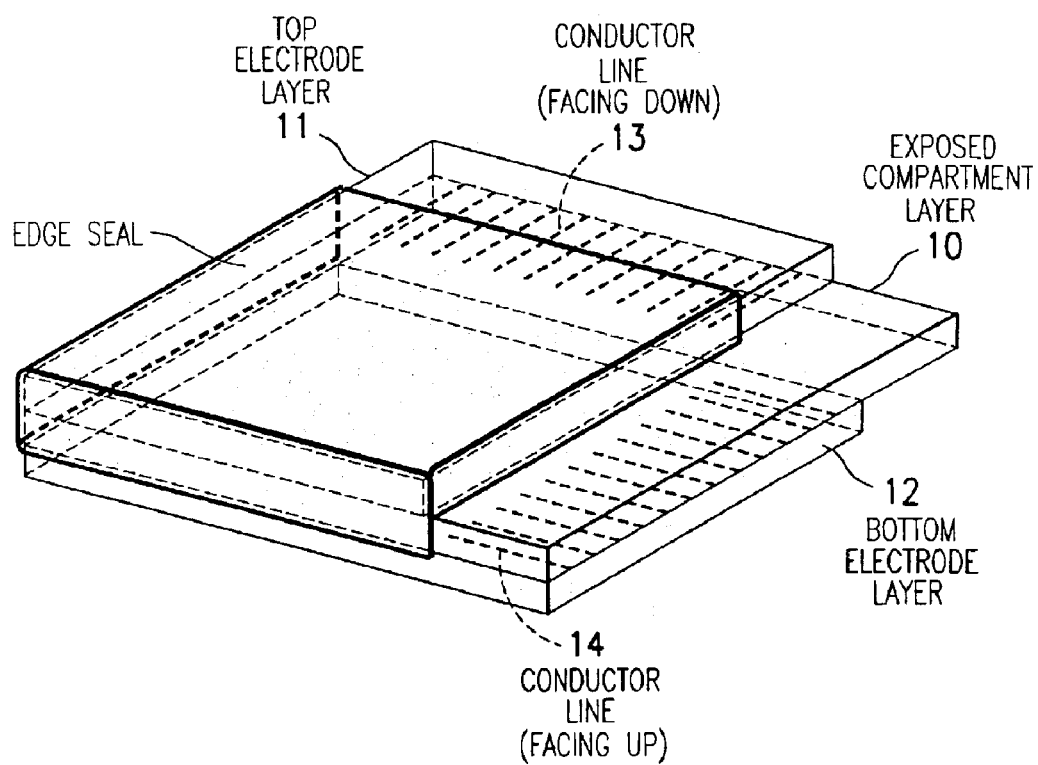
Figure 1E:
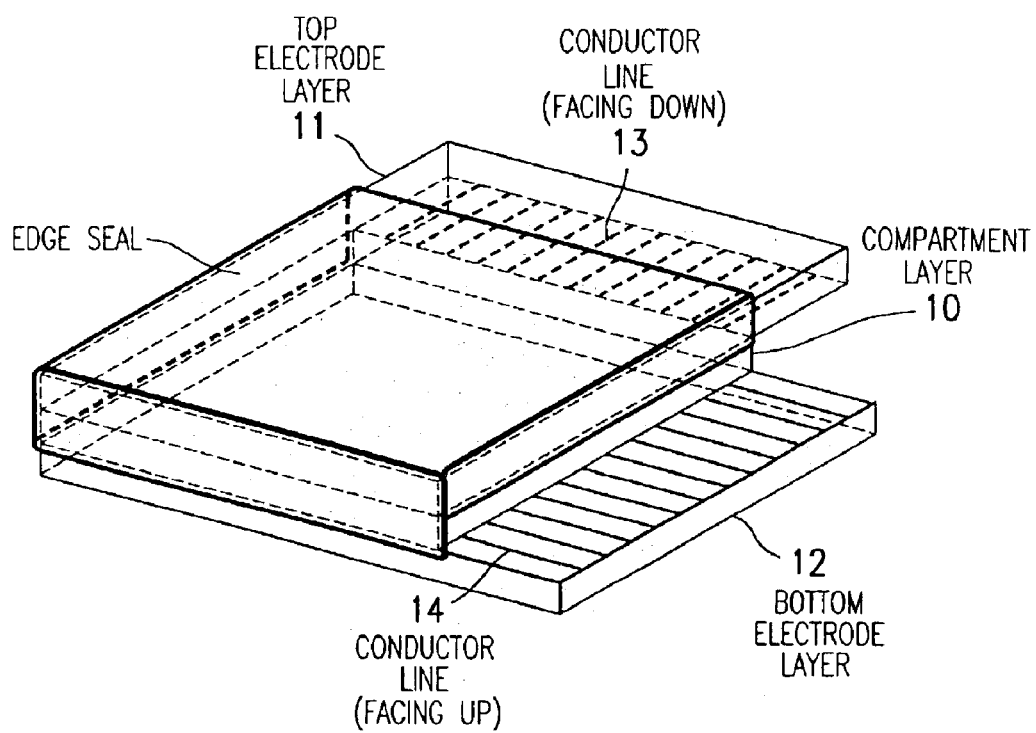

FIGS. 1b–1d demonstrate the stripping process of the invention. The process comprises several steps. Initially, as shown in FIG. 1b, a predetermined area on the first electrode layer (11) at end of a panel is removed by, for example, a die, diamond, knife or laser cutting method. The cut may optionally extend into the compartment layer underneath the first electrode layer; but not into the second electrode layer. Before stripping, preferably an edge sealing material is applied to all edge lines on all sides and/or to the surfaces where the edge lines appear (dark lines as shown in FIG. 1d) to protect areas not to be stripped. The exposed compartment (10) layer in the area is then subjected to the stripping by using a stripping solvent or solution (FIG. 1d). For clarity, the edge sealing shown in FIGS. 1(d) and 1(e) is for stripping off the compartment layer on one side only (the right-hand side to the viewer). For stripping off the compartment layer on the other side (the side away from the viewer in these two figures), the edges in the corresponding areas may be similarly sealed.

Suitable stripping solvents or solutions may include, but are not limited to, benzyl alcohol, ketones (such as cyclohexanone), isopropyl acetate, toluene and the like. Aqueous solutions such as alkaline developers for photoresist including developer solutions from Shipley (Marlborough, Mass.), such as MICROPOSIT® 453 DEVELOPER (a mixture of potassium hydroxide. water and inorganic borates) or MICROPOSIT® MF CD-26 DEVELOPMER (a mixture of water and tetramethvlammonium hydroxide) may also be used.

After the stripping step, the conductor lines or patterns on the second electrode layer (12) in the area are exposed (FIG. 1e) and are ready for connection to a driver circuitry.

Similarly the same process is repeated by first cutting the second electrode layer (as shown in FIG. 1c), followed by edging sealing and stripping off the compartment layer above the second electrode layer. After the stripping step, the conductor lines or patterns on the first electrode layer (11) in the area are also exposed (FIG. 1e) and are ready for connection to a driver circuitry.

PREFERRED EMBODIMENT OF THE INVENTION

Figure 2:
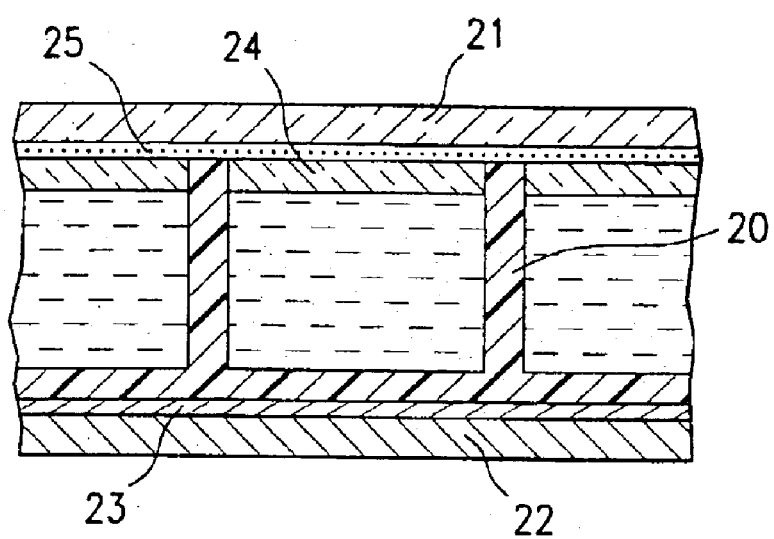
FIG. 2 is a schematic depiction of an electrophoretic display cell prepared by the microcup technology.

FIG. 2 depicts a typical display cell prepared by the microcup technology as disclosed in WO01/67170. The microcup based display cell (20) is sandwiched between a first electrode layer (21) and a second electrode layer (22). A primer layer (23) is optionally present between the cell and the second electrode layer (22). The cell (20) is filled with an electrophoretic fluid and sealed with a sealing layer (24). The first electrode layer (21) is laminated onto the sealed cell with an adhesive (25).

The display panel may be prepared by microembossing or photolithography as disclosed in WO01/67170. In the microembossing process, an embossable composition is coated onto the conductor side of the second electrode layer (22) and embossed under pressure to produce the microcup array. To improve the mold release property, the conductor layer may be pretreated with a thin strippable primer layer (23) before coating the embossable composition.

The embossable composition may comprise a thermoplastic, thermoset or precursors thereof which may be a multifunctional acrylate or methacrylate, vinylbezene, vinylether, epoxide, oligomers or polymers thereof, or the like. Multifunctional acrylate and oligomers thereof are the most preferred. A combination of a multifunctional epoxide and a multifunctional acrylate is also very useful to achieve desirable physico-mechanical properties. A crosslinkable oligomer imparting flexibility, such as urethane acrylate or polyester acrylate, is usually also added to improve the flexure resistance of the embossed microcups. The composition may contain an oligomer, monomer, additives and optionally a polymer. The glass transition temperature (Tg) for the embossable composition usually ranges from about $-70°$ C. to about $150°$ C., preferably from about $-20°$ C. to about $50°$ C.

The microembossing process is typically carried out at a temperature higher than the Tg. A heated male mold or a heated housing substrate against which the mold presses may be used to control the microembossing temperature and pressure.

The mold is released during or after the precursor layer is hardened to reveal an array of microcups (20). The hardening of the precursor layer may be accomplished by cooling, solvent evaporation, cross-linking by radiation, heat or moisture. If the curing of the thermoset precursor is accomplished by UV radiation, UV may radiate onto the thermoset precursor through the transparent conductor layer. Alternatively, UV lamps may be placed inside the mold. In this case, the mold must be transparent to allow the UV light to radiate through the pre-patterned male mold on to the thermoset precursor layer.

In one embodiment of the present invention, the microcup array (20) is strippable by an organic or aqueous stripper. To improve the strippability of the microcup array, a polymeric additive that is soluble or dispersible in the organic or aqueous stripper may be added to the embossing composition.

If an aqueous stripper is used, suitable polymeric additives for the embossing composition may include, but are not limited to, water soluble or dispersible polymers such as polyethylene glycol, poly(2-ethyl-2-oxazoline), polyvinylpyrrolidone (PVP), hydroxyethyl cellulose (HEC), hydroxypropyl cellulose (HPC) and copolymers or block copolymers thereof, acidic or basic copolymers derived from acrylic acid or methacrylic acid, such as Carboset 515 (from BFGoodrich, Cleveland, Ohio), itaconic acid, maleic anhydride, vinyl phthalate and vinylpyridine.

If an organic stripper is used, suitable polymeric additives for the embossing composition may include, but are not limited to, solvent soluble or dispersible polymers or oligomers such as polyester, polyvinyl butyral, acrylic or methacrylic copolymers, styrene copolymers, polycaprolatone, polyethers, polycarbonate, polyamides and polyurethane.

In one preferred embodiment of the present invention, a thin strippable primer layer (23) is precoated onto the conductor layer to improve both the stripping and mold release properties. The composition of the primer layer may be the same or different from the embossing composition. In one embodiment of the present invention, both the primer (23) and the embossing (20) layers are strippable.

In general, the dimension of each individual microcup may be in the range of about $10^2$ to about $5\times10^5$ $\mu m^2$, preferably from about $10^3$ to about $5\times10^4$ $\mu m^2$. The depth of the microcups is in the range of about 3 to about 100 microns, preferably from about 10 to about 50 microns. The ratio between the area of opening to the total area is in the range of from about 0.05 to about 0.95, preferably from about 0.4 to about 0.9. The width of the openings usually are in the range of from about 15 to about 450 microns, preferably from about 25 to about 300 microns from edge to edge of the openings.

The microcups are then filled with an electrophoretic fluid and sealed as disclosed in co-pending applications, U.S. Ser. No. 09/518,488, filed on Mar. 3, 2000 (corresponding to WO 01/67170), U.S. Ser. No. 09/606,654, filed on Jun. 28, 2000 (corresponding to WO 02/01281) and U.S. Ser. No. 09/784,972, filed on Feb. 15, 2001 (corresponding to WO02/65215), all of which are incorporated herein by reference.

The sealing of the microcups may be accomplished in a number of ways. Preferably, it is accomplished by overcoating the filled microcups with a strippable sealing composition comprising a solvent and a rubber material selected from the group consisting of thermoplastic elastomers, polyvalent acrylate or methacrylate, cyanoacrylates, polyvalent vinyl including vinylbenzene, vinylsilane, vinylether, polyvalent epoxide, polyvalent isocyanate, polyvalent allyl, oligomers or polymers containing crosslinkable functional groups and the like. Additives such as a polymeric binder or thickener, photoinitiator, catalyst, filler, colorant or surfactant may be added to the strippable sealing composition to improve the physico-mechanical properties and the optical properties of the display. The sealing composition is incompatible with the electrophoretic fluid and has a specific gravity lower than that of the electrophoretic fluid. Upon solvent evaporation, the sealing composition forms a conforming seamless seal on top of the filled microcups. The strippable sealing layer may be further hardened by heat, radiation or other curing methods. Sealing with a composition comprising a thermoplastic elastomer is particularly preferred. Examples of thermoplastic elastomers include tri-block or di-block copolymers of styrene and isoprene, butadiene or ethylene/butylene, such as the Kraton™ D and G series from Kraton Polymer Company. Crystalline rubbers such as poly(ethylene-co-propylene-co-5-methylene-2-norbornene) and other EPDM (Ethylene Propylene Diene Rubber terpolymer) from Exxon Mobil have also been found useful.

Alternatively, the strippable sealing composition may be dispersed into an electrophoretic fluid and filled into the microcups. The sealing composition is incompatible with the electrophoretic fluid and is lighter than the electrophoretic fluid. Upon phase separation and solvent evaporation, the sealing composition floats to the top of the filled microcups and forms a seamless sealing layer thereon. The sealing layer may be further hardened by heat, radiation or other curing methods. The sealing layer may be strippable by an organic or aqueous stripper.

The sealed microcups finally are laminated with the first electrode layer (21) pre-coated with an adhesive layer (25). The adhesive layer may also be strippable by an organic or aqueous stripper.

Preferred materials for the strippable adhesive layer may be formed from one adhesive or a mixture thereof selected from a group consisting of pressure sensitive, hot melt and radiation curable adhesives. The adhesive materials may include acrylics, styrene-butadiene copolymers, styrene-butadiene-styrene block copolymers, styrene-isoprene-styrene block copolymers, polyvinylbutyal, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. Adhesives comprising polymers or oligomers having a high acid or base content such as polymers or copolymers derived from acrylic acid, methacrylic acid, itaconic acid, maleic anhydride, vinylpyridine and their derivatives are particularly useful for an aqueous stripping process. The adhesive layer may be post cured by, for example, heat or radiation such as UV after lamination.

The display thus prepared is then subjected to cutting and stripping to expose the conductor lines or patterns for connection to driver circuitry as illustrated in FIGS. 1b–1e. The compartment layer (10), in this context, may comprise the adhesive (25), sealing (24), display cell (20) and primer (23) layers. As the first step, the top electrode layer in a predetermined area, usually at the end of the panel, is removed by, for example, a die, diamond, knife or laser cutting method. The cut may optionally extend into the compartment layer; but not into the second electrode layer. Before stripping, preferably an edge seal material is applied to the edge lines between all layers not to be stripped on all sides or to the surfaces where the edge lines appear. The edge seal material protects the layers not to be stripped off from the stripping solvent or solution used during stripping. Prior to edging sealing, an absorbent such as cotton ball may be used to remove the electrophoretic fluid in the microcup layer and as a result the microcup layer becomes void which ensures deep penetration of the sealing material.

The adhesive, sealing, display cell and primer layers are stripped off using a stripping solvent, such as benzyl alcohol, isopropyl acetate, butyl acetate, methoxyethanol, butanol, toluene, xylene, cyclohexanone or ketones, lactones, esters, ethers, alcohols, amides, pyrrolidones and derivatives or mixtures thereof.

Alternatively, the layers may be stripped off using an aqueous stripper, such as aqueous developer MICROPOSIT® 453 DEVELOPER (a mixture of potassium hydroxide, water and inorganic borates) or MICROPOSIT® MF CD-26 DEVELOPMER (a mixture of water and tetramethylammonium hydroxide) (from Shipley, Marlborough, Mass.), which is particularly useful if an acid composition is used for the primer, microcup, sealing or adhesive layer. Stripping may also be assisted by spraying of the stripper by a nozzle or compressed air, a soft brush and other mechanical or physical means.

The stripping process as described above removes the layers in the area except the second electrode layer (22). As a result, the second electrode layer in the area is exposed and the conductor lines on the exposed area may then be connected to a driver circuitry. The same stripping process may similarly be carried out to expose the conductor lines on the first electrode layer (21) as illustrated in FIGS. 1c–1e.

The stripping process of the invention may be used in the manufacture of electromagnetophoretic displays. The process is carried out similarly except that the first electrode layer (21) is replaced with a substrate layer (not coated with a conductor film). In other words, in the first step of the process, a part of the substrate layer is removed by die cutting or other equivalent means, followed by stripping off the layers underneath to expose the electrode layer (22) for connecting the conductor lines to a driver circuitry.

EXAMPLES

The following examples are given to enable those skilled in the art to more clearly understand and to practice the present invention. They should not be considered as limiting the scope of the invention, but merely as being illustrative and representative thereof.

Example 1

I. Preparation of Strippable Primer Composition

Solution (a)

33.2 Grams of EB 600™ (UCB, Smyrna, Ga.), 16.12 gm of SR 399™ (Sartomer, Exton, Pa.), 16.12 gm of TMPTA (UCB, Smyrna, Ga.) and 20.61 gm of HDODA (UCB, Smyrna, Ga.) were added into a 250 gm plastic round bottle. The mixture was stirred with a general purpose blade at 500 RPM for 30 minutes.

Solution (b)

2 Grams of lrgacure™ 369 (Ciba, Tarrytown, N.Y.) and 1 gm of Irganox™ 1035 were combined into a glass bottle containing 10 gm of MEK (Fisher, Pittsburgh, Pa.). The mixture was sonicated (FS-220H, Fisher, Pittsburgh, Pa.).

Solution (c)

44.35 Grams of polyethylmethacrylate (Aldrich, Milwaukee, Wis.) and 389.15 gm of MEK were combined into a 1 liter plastic bottle and the mixture was stirred with a 1" general purpose blade at 500 rpm for 60 minutes.

Solutions (a) and (b) prepared above were added into solution (c) contained in a 1 liter bottle, and the mixture was stirred with a 1" general purpose blade at 500 rpm for 30 minutes. This strippable primer solution was then coated with #4 wire bar onto the a 4 mil ITO film. The coated ITO film was placed in an oven at 65° C. for 10 minutes and then cured with a UV conveyer at the dosage of 1.8 J/cm2 under nitrogen blanket (DDU, Los Angles, Calif.).

II. Preparation of Microcups

TABLE 1

| Microcup Composition | | |
|---|---|---|
| Component | Weight Part | Source |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

Solution (d)

33.15 Grams of EB 600™ (UCB, Smyrna, Ga.) and 32.24 gm of SR 399™ (Sartomer, Exton, Pa.), 6.00 gm of EB1360™ (UCB, Smyrna, Ga.) and 8 gram of Hycar 1300×43 (reactive liquid polymer, Noveon Inc. Cleveland, Ohio.) were added into a 250 ml LDPE bottle and the mixture was stirred with Stir-Pak Laboratory mixer (Cole Parmer, Vernon, Ill.) at 500 RPM for 30 minutes.

Solution (e)

0.2 Gram of lrgacure™ 369 (Ciba, Tarrytown, N.Y.), 0.04 gram of ITX (Isopropyl-9H-thioxanthen-9-one, Aldrich, Milwaukee, Wis.), 0.1 gm of Irganox™ 1035 (Ciba, Tarrytown, N.Y.) and 20.61 gram of HDDA (1,6-hexanediol diacrylate, UCB, Smyrna, Ga.) were added into a 250 ml of LDPE bottle and the mixture was sonicated for 30 minutes (FS-220H, Fisher, Pittsburgh, Pa.).

Solution (e) prepared above was then added to solution (d) contained in a 250 ml LDPE bottle and the mixture was stirred with Stir-Pak mixer first at 500 RPM for 10 minutes and then at 2000 rpm for another minute. The mixture was then centrifuged with IEC HN-SII (International Equipment Company, Needham Heights, Mass.) at 2000 rpm for 15 minutes.

The microcup composition was slowly filled onto a 4"×4" Ni mold made from electroforming. A plastic pipette was used to gently squeeze the composition into "valleys" of the Ni mold and enough time was allowed for releasing trapped air bubbles. The thus coated Ni mold was placed on a paper-covered glass substrate (0.6 mm thick of paper, i.e., 6 sheets of copy paper, Xerographic, white 20 lb, Grays Harbor Paper, Hoquiam, Wash., on 1/16" glass) in an oven at 65° C. for 5 minutes. The microcup layer was then covered with a primer coated ITO/PET layer prepared from section I, with the primer layer facing the coated Ni mold. A smooth polished bar was used to squeeze out air pockets between the ITO/PET substrate and the Ni mold A GBC Eagle 35 laminator (from GBC, Northbrook, Ill.) with the setting of roll temperature at 100° C., lamination speed at 1 ft/min and roll gap of "heavy gauge" was then used to laminate the primer coated ITO/PET substrate over the microcup layer. A UV curing station with a UV intensity of 2.5 mJ/cm² was used to cure the panel for 5 seconds. The microcup composition coated ITO/PET layer was then peeled away from the Ni mold at an angle about 30 degree to give a 4"×4" microcup layer.

A conveyor (DDU, Los Angles, Calif.) with a UV intensity of 1.7 J/cm2 was used to post-cure the microcup layer under nitrogen blanket.

III. Preparation of Electrophoretic Fluid 5.9 Gram of $TiO_2$ R900™ (DuPont) was added to a solution consisting of 3.77 gm of MEK, 4.54 gm of N3400™ aliphatic polyisocyanate (Bayer AG) and 0.77 gm of 1-[N, N-bis(2-hydroxyethyl)amino]-2-propanol (Aldrich). The resultant slurry was homogenized for 1 minute at 5–10° C., after which 0.01 gm of dibutyltin dilaurate (Aldrich) was added and the mixture was homogenized for an additional minute. Finally a solution containing 20 gm of HT-200™ (Ausimont, Thorofare, N.J.), 0.47 gm of Rf-amine4900, a condensate of Krytox methyl ester (from Du Pont) and tris(2-aminoethyl)amine was added and the mixture was homogenized again for 3 more minutes at room temperature.

The Rf-amine4900 was prepared according to the following reaction:

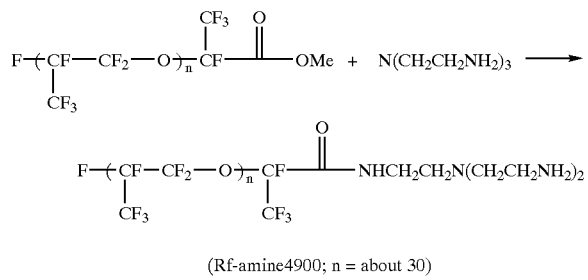

(Rf-amine4900; n = about 30)

The slurry prepared above was added slowly over 5 minutes at room temperature under homogenization into a mixture containing 31 gm of HT-200 and 2.28 gm of Rf-amine4900. The resultant $TiO_2$ microcapsule dispersion was stirred under low shear with a mechanical stirrer at 35° C. for 30 minutes, then heated to 85° C. to remove MEK and post cure the internal phase for three hours. The dispersion showed a narrow particle size distribution ranging from 0.5-3.5 microns. The microcapsules were separated by centrifuge.

IV. Filling and Sealing with a Strippable Sealing Composition

One gram of the electrophoretic composition prepared in section III was added into the microcups in the patterned area with a smoothing bar. The electrophoretic composition contains 6 parts (based on dry weight) of the $TiO_2$ microparticles and 94 parts of a HT-200 (Ausimont, Thorofare, N.J.) solution containing 1.5 wt % of a perfluorinated Cu-phthalocyanine dye (FC-3275, 3M, St. Paul, Minn.). The filled microcups were then sealed with a strippable sealing composition using a 6 mil coating knife.

The strippable sealing composition was prepared by mixing a 10% rubber solution consisting of 8.1 parts of Kraton G1650™ (Kraton Polymer Co, Houston, Tex.), 0.9 parts of GRP 6919™ (Kraton Polymer Co., Houston, Tex.), 0.3 parts of Carb-O-Sil™ TS-720 (from Cabot Corp., Ill.), 0.03 parts of Irgacure 369 (Ciba Specialty Chemical, Oakbrook, Ill.), 0.09 parts of ITX (Aldrich, Milwaukee, Wis.), 78.3 parts of Isopar™ E (Exxon Chemical Co., Houston, Tex.) and 8.7 part of isopropyl acetate (Aldrich, Milwaukee, Wis.). The composition was overcoated onto filled microcups by a Universal Blade Applicator and the coating was dried at room temperature to form a seamless sealing layer of about 3 microns thick.

V. Lamination

A strippable adhesive composition consisting of 20.0 g of 50% Carboset 515 (B.F. Goodrich, Cleveland, Ohio) in 3:1 methyl ethyl ketone (MEK) (certified grade, Fisher Scientific, Pittsburgh, Pa.):2-ethoxyethanol (certified grade, Aldrich Chemical, Milwaukee, Wis.), 2.0 g of SB400 (Sartomer, Exton, Pa.), 7.0 g of SR 502 (Sartomer, Exton Pa.), 3.0 g of CD9038 (Sartomer, Exton Pa.), 0.20 g of Irgacure 369 (Ciba Specialty Chemical, Tarrytown, N.Y.), 0.10 g of ethyl-4-dimethylaminobenzoate (Aldrich, Milwaukee, Wis.) and 0.03 g of isopropyl-9H-thioxanthene-9-one (ITX, Aldrich, Milwaukee, Wis.), was coated on 5 mil thick ITO/PET (CP Films, Martinsville, Va.) using a #3 Meyer bar and was dried using a heat gun for about 15 seconds.

The adhesive coated ITO/PET layer was then laminated over the sealed microcups prepared from section IV with a GBC Eagle 35 laminator at 70° C. The lamination speed was set at 1 ft/min with a gap of 1/32". The coating was irradiated for 60 seconds using a UV conveyor (DDU, Los Angeles, Calif.) for a total exposure of 3.3 J/cm².

VI. Asymmetric Die Cutting

The laminated panel was die-cut by a cutter equipped with two knives. One of the knives was used to cut the shape for the panel and the other was used for asymmetric kiss cutting. The asymmetrical cut panel was shown in FIGS. 1b and 1c. The top ITO film layer was peeled off to expose the layers underneath, which are to be stripped.

VII. Edge Sealing

All edges of the cut panel, except the edges of the layers to be stripped, were sealed with a UV-adhesive NOA68 (from Norland Products Inc.,Cranbury, N.J.) and cured with the UV dosage of 6 J/cm².

VIII. Stripping of the Panel

The cut panel with exposed strippable area was dipped into benzyl alcohol at 60° C. for 3 minutes with a 1" magnetic stirrer at a speed setting of 6. The primer layer and adhesive layer were dissolved and the microcups were removed with a brush. The resulting device was tested and found to have adequate contrast at low voltages.

Example 2

The procedure of Example 1 was followed except that the UV-strippable adhesive used in section I was replaced by a pressure sensitive adhesive Dura-tak-1105 (National Starch and Chemical Co., Bridgewater, N.J.) and the UV curing step was skipped in the lamination step. The resulting device was tested and found to have adequate contrast at low voltages.

Example 3

The procedure of Example 1 was followed, except that in the preparation of the strippable primer layer composition in section I, polyethylmethacrylate (Aldrich, Milwaukee, Wis.) was replaced with Carboset 515 (BF Goodrich, Cleveland, Ohio).

Example 4

The procedure of Example 3 was followed, except that in section IV the stripping solvent, benzyl alcohol, was replaced with an aqueous developer solution, Shipley 453 or CD26 (Shipley, Marlborough, Mass.).

Example 5

The procedure of Example 1 was followed, except that in the edge sealing in section VII, UV-adhesive NOA68 was replaced with a heat curable epoxy based adhesive, Super Instant epoxy 90 seconds-Araldite (Pacer Technology, Rancho Cucamonga, Calif.). The two part adhesive was applied on the edge of EPD and cured for 5 minutes at 60° C. in an oven.

Example 6

The procedure of Example 1 was followed, except that in the preparation of the strippable primer layer composition in section I, the UV-curable primer was replaced with Butvar™. 10 Grams of Butvar™ 98, Polyvinyl butyral, (Solutia, St. Louis, Mo.) was added slowly into a 250 ml PP bottle containing 30 gram of MEK (Fisher, Pittsburgh, Pa.). The mixture was then stirred with a Stir-Pak Laboratory mixer (Cole Parmer, Vernon, Ill.) at 500RPM for 30 minutes, and then coated with a #6 wire bar onto the 4 mil ITO/PET film.

Example 7

The procedure of Example 4 was followed, except that in section IV the stripping solution, Shipley 453 or CD26 (Shipley, Marlborough, Mass.), was replaced with an alkaline solution of 10% sodium carbonate.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. A process for manufacturing an electrophoretic display comprising a display cell layer sandwiched between a first electrode layer and a second electrode layer, which process comprises removing part of the first electrode layer and stripping off the display cell layer underneath to expose conductor lines on the second electrode layer for connection to a driver circuitry.

2. A roll-to-roll process for the manufacture of an electrophoretic display which process comprises the process of claim 1 without a strip or patch coating/embossing process.

3. A process for the manufacture of an electrophoretic display which process comprises the process of claim 1 and a strip or patch coating/embossing process.

4. A process for manufacturing an electrophoretic display comprising a first electrode layer and a second electrode layer, a display cell layer sandwiched between the two electrode layers; and optionally an adhesive layer between one of the two electorde layers and the dispaly cell layer, which process comprises:

a) removing the first electrode layer in a predetermined area;

b) stripping off the adhesive layer if present, and the display cells layer in the predetermined area to expose the second electrode layer thereunder; and c) connecting conductor lines or patterns on the exposed electrode second electrode layers to a driver circuitry.

5. The process of claim 4, further comprising applying a protective coating or edge seal to protect area not to be stripped, before step (b).

6. The process of claim 5 wherein said adhesive layer if present and said display cell layer in the unprotected area are stripped off by a stripping solvent.

7. The process of claim 5 wherein said protective coating or edge seal is a highly crosslinked polymer.

8. The process of claim 7 wherein said highly crosslinked polymer is selected from a group comprising epoxy resins, polyurethanes and radiation cured multifunctional acrylates and vinyls.

9. The process of claim 4 wherein said first electrode layer in the predetermined area is removed by die cutting, diamond cutting, knife cutting or laser cutting.

10. The process of claim 4 wherein said adhesive layer is formed from one adhesive or a mixture of adhesives selected from a group consisting of pressure sensitive, hot melt and radiation curable adhesives.

11. The process of claim 10 wherein said adhesive layer comprises a multifunctional acrylate and a solvent soluble or dispersible polymer or oligomer.

12. The process of claim 11 wherein said solvent soluble or dispersible polymer or oligomer is selected from a group consisting of polyester, polyvinyl butyral, acrylic or methacrylic copolymers, styrene copolymers, polycaprolactone, polyethers, polycarbonate, polyamides and polyurethane.

13. The process of claim 10 wherein said adhesive layer comprises a multifunctional acrylate and a water soluble or dispersible polymer or oligomer.

14. The process of claim 13 wherein said water soluble or dispersible polymer or oligomer is selected from a group consisting of polyethylene glycol, poly(2-ethyl-2-oxazoline), polyvinylpyrrolidone, hydroxyethyl cellulose, hydroxypropyl cellulose, and their copolymers or block copolymers, acidic or basic copolymers derived from acrylic acid or methacrylic acid, itaconic acid, maleic anhydride, vinyl phthalate and vinylpyridine.

15. The process of claim 4 wherein said adhesive layer if present and said display cell layer in the predetermined area where the first electrode layer has been removed are stripped off by a stripping solvent.

16. The process of claim 15 wherein said stripping solvent is selected from a group consisting of benzyl alcohol, isopropyl acetate, butyl acetate, methoxyethanol, butanol, toluene, xylene, cyclohexanone or ketones, lactones, esters, ethers, alcohols, amides, pyrrolidones and their derivatives or mixtures.

17. The process of claim 15 wherein said stripping solvent is an aqueous stripper.

18. The process of claim 17 wherein said aqueous stripper is a mixture of potassium hydroxide water and inorganic borates or a mixture of water and tetramethylammonium hydroxide.

19. The process of claim 4 wherein the stripping of said adhesive layer if present and said display cell layer comprises a step of using a nozzle or compressed air, a soft brush or other mechanical or physical means to assist stripping.

20. A process for manufacturing an electrophoretic display comprising a first electrode layer and a second electrode layer, a layer of display cells sandwiched between the two electrode layers and the display cells sealed with a sealing layer, optionally a primer layer between the layer of display cells and the second electrode layer and further optionally an adhesive layer between the layer of display cells and the first electrode layer, which process comprises:

a) removing the first electrode layer in a predetermined area;

b) stripping off the adhesive layer if present, the display cell, the sealing layer and the primer layer if present, in the predetermined area to expose the second electrode layer thereunder; and c) connecting conductor lines or patterns on the exposed electrode layer to a driver circuitry.

21. The process of claim 20, further comprising applying a protective coating or edge seal to protect areas not to be stripped, before step (b).

22. The process of claim 21 wherein the adhesive layer if present, the layer of display cells, the sealing layer and the primer layer if present, in the unprotected area are stripped off by a stripping solvent.

23. The process of claim 22 wherein said stripping solvent is selected from a group consisting of benzyl alcohol, isopropyl acetate, butyl acetate, methoxyethanol, butanol, toluene, xylene, cyclohexanone or ketones, lactones, esters, ethers, alcohols, amides, pyrralidones and their derivatives or mixtures.

24. The process of claim 22 wherein said stripping solvent is an aqueous stripper.

25. The process of claim 24 wherein said aqueous stripper is a mixture of potassium hydroxide, water and inorganic borates or a mixture of water and tetramethylammonium hydroxide.

26. The process of claim 21 wherein said protective coating or edge seal is a highly crosslinked polymer.

27. The process of claim 26 wherein said highly crosslinked polymer is selected from a group consisting of epoxy resins, polyurethanes and radiation cured multifunctional acrylates and vinyls.

28. The process of claim 20 wherein said first electrode layer in the predetermined area is removed by die cutting, knife cutting, diamond cutting, or laser cutting.

29. The process of claim 20 wherein said adhesive layer is formed from one adhesive or a mixture of adhesives selected from a group consisting of pressure sensitive, hot melt and radiation curable adhesives.

30. The process of claim 29 wherein said adhesive layer comprises a multifunctional acrylate and a solvent soluble or dispersible polymer or oligomer.

31. The process of claim 30 wherein said solvent soluble or dispersible polymer or oligomer is selected from a group consisting of polyester, polyvinyl butyral, acrylic or methacrylic copolymers, styrene copolymers, polycaprolactone, polyethers, polycarbonate, polyamides and polyurethane.

32. The process of claim 29 wherein said adhesive layer comprises a multifunctional acrylate and a water soluble or dispersible polymer or oligomer.

33. The process of claim 32 wherein said water soluble or dispersible polymer or oligomer is selected from a group consisting of polyethylene glycol, poly(2-ethyl-2-oxazoline), polyvinylpyrrolidone, hydroxyethyl cellulose, hydroxypropyl cellulose, and their copolymers or block copolymers, acidic or basic copolyiners derived from acrylic acid or methacrylic acid, itaconic acid, maleic anhydride, vinyl phthalate and vinylpyridine.

34. The process of claim 20 wherein the adhesive layer if present, the layer of display cells, the sealing layer and the primer layer if present, in the predetermined area where the first electrode layer has been removed are stripped off by a stripping solvent.

35. The process of claim 20 wherein the stripping of the adhesive layer if present, the layer of display cells, the sealing layer and the primer layer if present comprises a step of using a nozzle or compressed air, a soft brush or other mechanical or physical means to assist stripping.

36. A process for manufacturing an electromagnetophoretic display comprising a display cell layer sandwiched between a substrate layer and an electrode layer, which process comprises removing part of the substrate layer and stripping off the display cell layer underneath to expose conductor lines on the electrode layer for connection to a driver circuitry.

37. A roll-to-roll process for the manufacture of an electromagnetophoretic display which process comprises the process of claim 36 without a strip or patch coating/embossing process.

38. A process for the manufacture of an electromagnetophoretic display which process comprises the process of claim 36 and a strip or patch coating/embossing process.

39. A process for manufacturing an electromagnetophoretic display comprising a substrate layer and an electrode layer, a display cell layer sandwiched between the substrate layer and the electrode layer, and optionally an adhesive layer between one of the substrate layer and the electrode layer and the display cell layer, which process comprises:

a) removing the substrate layer in a predetermined area;

b) stripping off the adhesive layer if present, and the display cell layer in the predetermined area to expose the electrode layer thereunder; and c) connecting conductor lines or patterns on the exposed electrode layer to a driver circuitry.

40. The process of claim 39 further comprising applying a protecting coating or edge seal to protect areas not to be stripped, before step (b).

41. A process for manufacturing an electromagnetophoretic display comprising a substrate layer and an electrode layer, a layer of display cells sandwiched between the substrate layer and the electrode layer and the display cells are sealed with a sealing layer, optionally a primer layer between the layer of display cells and the electrode layer and further optionally an adhesive layer between the layer of display cells and the substrate layer, which process comprises:

a) removing the substrate layer in a predetermined area;

b) stripping off the adhesive layer if present, the layer of display cells the sealing layer and the primer layer if present, in the predetermined area to expose the electrode layer thereunder; and c) connecting conductor lines or patterns on the exposed electrode layer to a driver circuitry.

42. The process of claim 41 further comprising applying a protecting coating or edge seal to protect areas not to be stripped, before step (b).

43. A composition for shippable sealing and adhesive layers useful in the preparation of an electrophoretic or electromagnetophoretic display, which composition comprises a solvent and a rubber material selected from a group consisting of thermoplastic elastomers, polyvalent acrylate or methacrylate, cyanoacrylates, polyvalent vinyl polyvalent epoxide, polyvalent isocyanate, polyvalent allyl and oligomers or polymers containing crosslinkable functional groups.

44. The composition of claim 43 further comprising an additive.

45. The composition of claim 44 wherein said additive is a polymeric binder or thickener, photoinitiator, catalyst, filler, colorant or suffactant.

* * * * *

UNITED STATES PATENT AND TRADEMARK OFFICE
CERTIFICATE OF CORRECTION

PATENT NO. : 6,873,452 B2
DATED : March 29, 2005
INVENTOR(S) : Scott C-J. Tseng et al.

It is certified that error appears in the above-identified patent and that said Letters Patent is hereby corrected as shown below:

Column 9,
Line 13, after "mold" add a period -- . --;
Line 66, change "contains" to -- contained --.

Column 10,
Line 13, change "part" to -- parts --;
Line 43, change "are" to -- were --.

Column 12,
Line 4, change "display cells" to -- display cell --;
Line 7, delete the first word "eletrode";
Line 7, change "layers" to -- layer --;
Line 9, change "area" to -- areas --;
Line 56, after the word "hydroxide" add -- , --.

Column 13,
Lines 5-6, change "if present, the display cell" to -- if present, the layer of display cells --;
Line 10, before "electrode layer" add -- second --.

Column 14,
Line 43, between "display cells" and "the sealing layer" add -- , --;
Line 51, change "shippable" to -- strippable --;
Line 56, between "vinyl" and "polyvalent" add -- , --;
Line 64, change "suffactant" to -- surfactant --.

Signed and Sealed this

Fourth Day of October, 2005

JON W. DUDAS
*Director of the United States Patent and Trademark Office*